Figure 9:
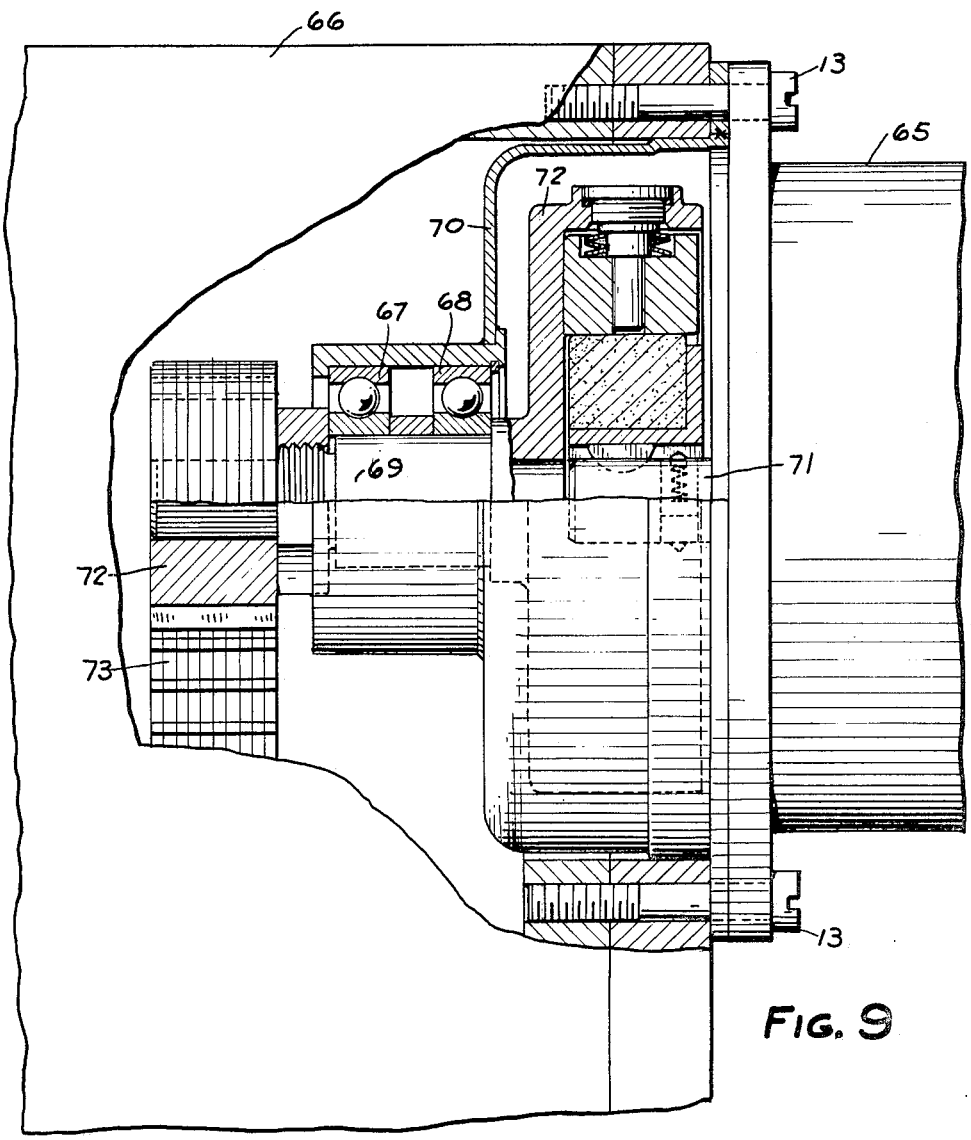

Jan. 18, 1966  C. C. HILL ETAL  3,229,795
STARTER CLUTCH FOR GAS TURBINES
Filed Dec. 20, 1962  3 Sheets-Sheet 1
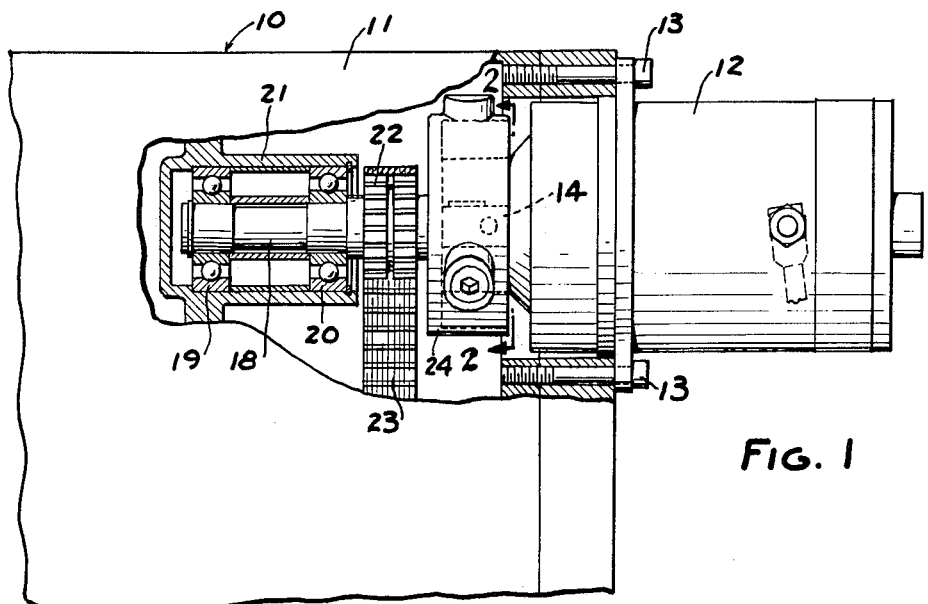
FIG. 1
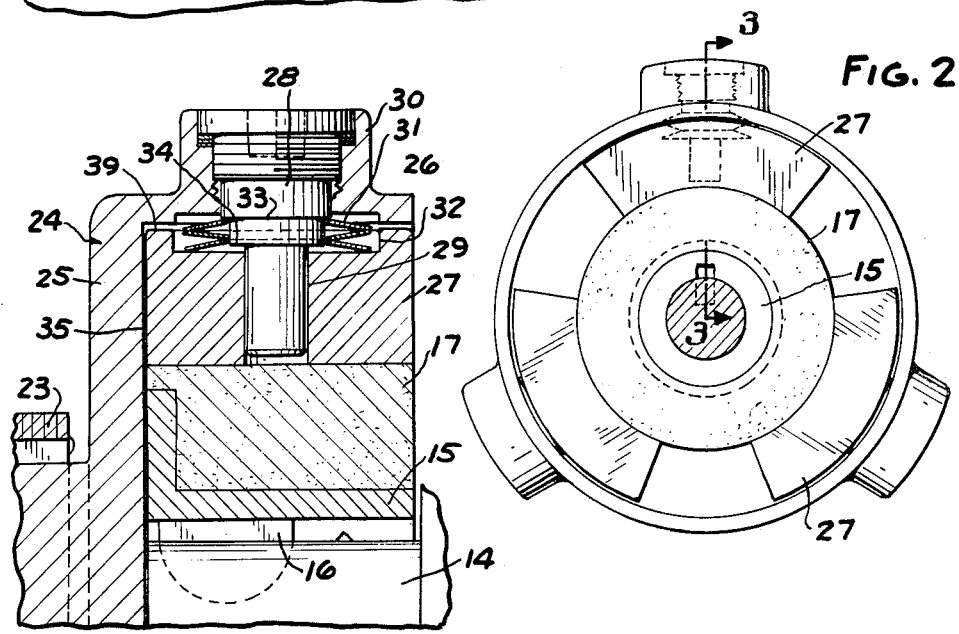
FIG. 2
FIG. 3.
INVENTORS
CHARLES C. HILL & CHARLES J. SCHERF
BY
Barnes, Kisselle, Raisch & Choate
ATTORNEYS

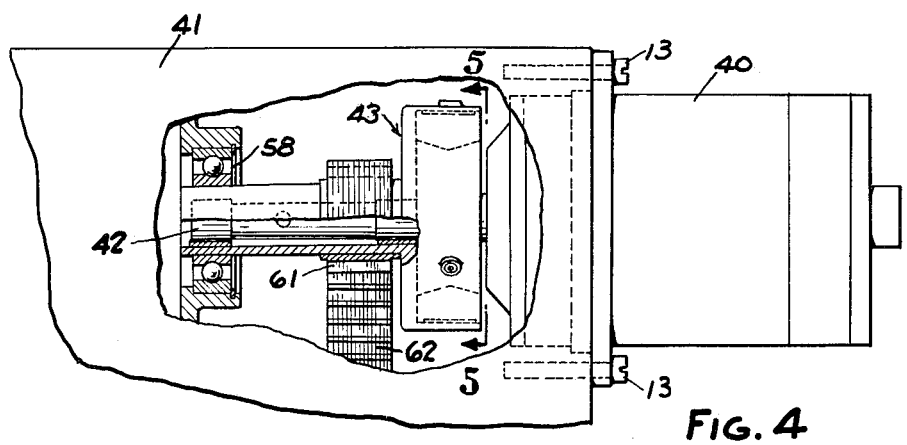
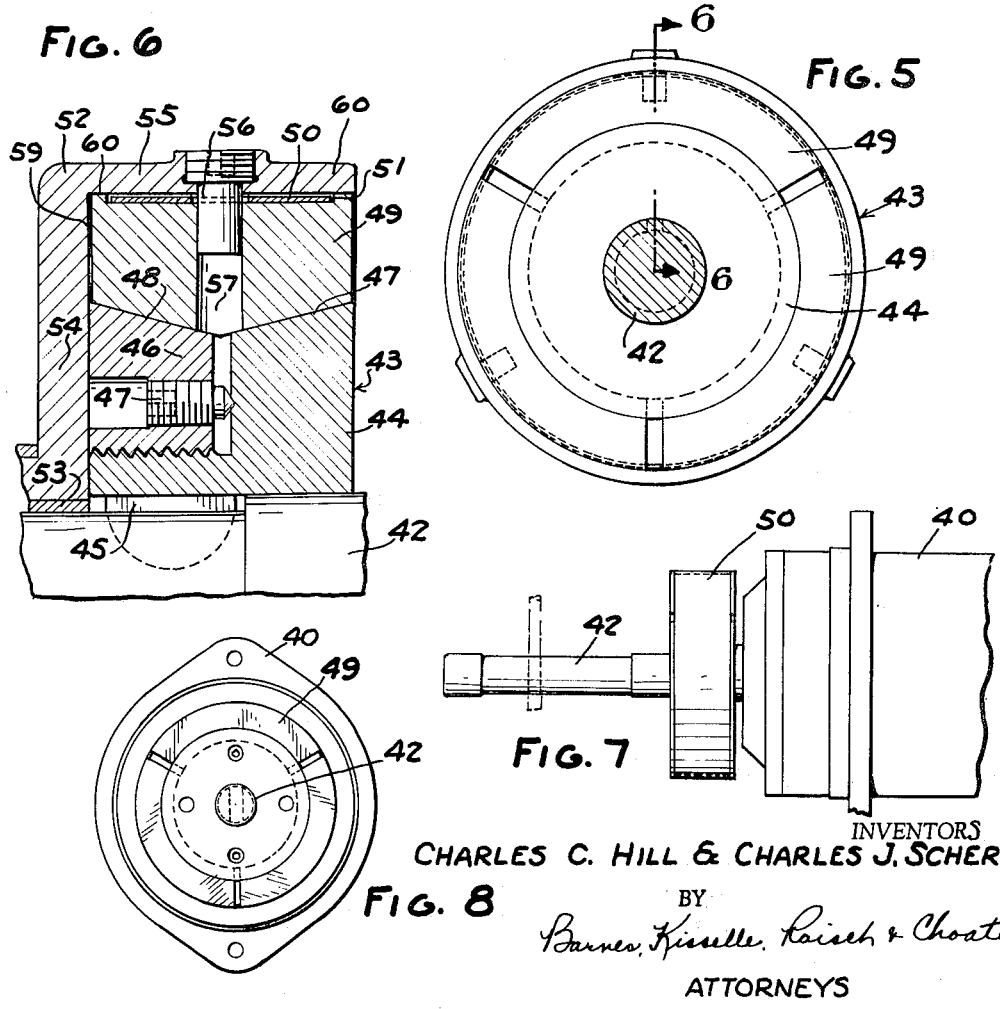

INVENTOR.
CHARLES C. HILL & CHARLES J. SCHERF

United States Patent Office 3,229,795
Patented Jan. 18, 1966

3,229,795
STARTER CLUTCH FOR GAS TURBINES
Charles C. Hill, 1148 Vesper Ave., and Charles J. Scherf,
520 S. 6th St., both of Ann Arbor, Mich.
Filed Dec. 20, 1962, Ser. No. 246,153
3 Claims. (Cl. 192—104)

This invention relates to starter clutches for use in starting high-speed engines, such as gas turbine engines. In order to make starter motors light, compact and economical the motor speed is made as high as practical. Operating the motor substantially beyond its design speed will result in excessive wear and even structural failure. Since the motor is of value for starting only at low engine speeds (typically up to about 20–25% of maximum speed), and since it is already rotating at its design speed at this point, the motor must be disengaged from the engine otherwise it will increase speed with the engine and reach about four or five times design speed at 100% engine speed.

One important attribute of an ideal gas turbine starter clutch is that it should have a shock free load pickup. Turbines characteristically have a large step-up gear ratio between starter or other accessories and compressor-turbine rotor. This fact causes the starter to encounter a large reflected inertia which is proportional to the square of the gear ratio. Any slack in the engaging device such as tooth spacing of a jaw clutch results in large transient torques throughout the drive system.

Another attribute of an ideal gas turbine starter clutch is that it should have a limiting torque. Since gas turbine rotors operate at relatively high speeds the torque for any given power is relatively low during running at full speed. To minimize weight the designer desires to design for this torque. However, the torque speed characteristics of starter motors, coupled with the fairly large inertia of the turbine rotor, can bring about a condition during starting at low speeds when the starting torque exceeds the design maximum power torque. Under these conditions the ideal starter clutch will limit the transmitted torque to a safe value.

Another attribute of an ideal gas turbine starter clutch is that it should have an accurate absolute engagement and disengagement speed. The ideal clutch should disengage upon reaching a predetermined absolute engine speed. Disengagement when the relative speed of the engine exceeds the starter is undesirable for two reasons. First, certain transient conditions during starting such as surge or hot light off may momentarily cause engine speed to exceed starter speed. If the clutch disengages under this condition and an instant later re-engages, a sudden torsion is applied to the drive system and may damage some types of clutches or other engine parts. Second, if the operator or automatic control calls for a restart while the engine is coasting down to a stop the starter runs free up to the engine speed and then instantly engages with a large shock.

Another attribute of an ideal gas turbine starter clutch is that it have zero drag at high relative speeds. After disengagement, the starter clutch of the gas turbine characteristically experiences high relative rotational speed. Since the starter motor has very little drag it will be rotated by any substantial drag torque transmitted through the clutch. Drag torque also represents a continual power loss and heat input to the lubrication system.

Another attribute of a ideal gas turbine starter clutch is that it be free of maintenance for the life of the gas turbine engine. The ideal clutch will perform its functions without any maintenance during the expected total engine life. This implies as many as 30,000 starts in certain automotive applications and also self-adjustment for any wear which may take place during service.

Another attribute of an ideal gas turbine starter clutch is that it should be reliable and fail safe. The ideal clutch will have a maximum probability of functioning properly at any time and if failure of any component occurs during running the failure should not cause or require stopping of the engine. It should also be difficult to improperly assembly the clutch after engine overhaul or inspection in the field.

In addition, an ideal gas turbine starter clutch should have wide environmental adaptability. The ideal clutch will function in either wet or dry locations and should not be dependent on lubrication viscosity or other variables influenced by ambient temperatures.

Finally, an ideal gas turbine starter clutch should have compactness and be light in weight and have a low installed cost.

It is therefore an object of this invention to provide a gas turbine starter clutch for use with gas turbine engines and electric, hydraulic or pneumatic starters which has shock free load pickup, limiting torque, accurate absolute engagement and disengagement speed, zero drag at high relative speeds, no maintenance for the life of the gas turbine engine, reliability and fail safe characteristics, wide environmental adaptability, compactness and light weight and low cost.

Basically, the starter clutch embodying the invention comprises a clutch drum which is fixed to the shaft of the starter and a clutch segment carrier that is operatively connected to the turbine and surrounds the drum. Arcuate clutch shoe segments are interposed between the carrier and the drum and spring means are provided between the carrier and the segments. In addition, means in the form of pins are provided to guide the segments and adjust the spring force on the segments. The springs provide for an accurate control of the disengaging and engaging speed of the starter clutch. The springs are preferably non-linear, that is, of the type that the spring rate decreases at increasing loads. The use of such non-linear springs permits the clutch to completely disengage with a smaller change in speed.

In the drawings:
FIG. 1 is a part sectional view of a gas turbine embodying the invention.
FIG. 2 is a sectional view taken along the line 2—2 in FIG. 1.
FIG. 3 is a fragmentary sectional view on an enlarged scale taken along the line 3—3 in FIG. 2.
FIG. 4 is a part sectional view of a gas turbine embodying a modified form of the invention.
FIG. 5 is a sectional view taken along the line 5—5 in FIG. 4.
FIG. 6 is a fragmentary sectional view on an enlarged scale taken along the line 6—6 in FIG. 5.
FIG. 7 is a side elevation of a part of the starter removed from the turbine.
FIG. 8 is an end view of the parts shown in FIG. 7.
FIG. 9 is a part sectional view of a gas turbine embodying a further modified form of the invention.

Referring to FIG. 1, the turbine 10 has a housing 11 on which a series-wound starter motor 12 is mounted by screws 13. Starter motor 12 is of the electric type and includes a shaft 14 that projects inwardly within the housing 11. A clutch drum 15 of steel or the like is fixed on the shaft 14 by a key 16 and includes a cylindrical friction surface formed by body 17. Body 17 is made of a suitable friction material such as a block of copper-silicon-graphite sintered to drum 15. A drive shaft 18 is rotatably mounted within the housing 11 by bearings 19, 20 positioned in a hub 21 within the housing 11. The shaft 18 is adapted to be driven by the starter clutch as presently described. Gears 22 are fixed on the shaft 18 and are adapted to drive the turbine rotor by an endless flexible element 23 in the form of a chain. A clutch segment carrier 24 is also fixed on the shaft 18 and includes a radial wall 25 and an axial cylindrical wall 26 that overlies the outer surface of the clutch drum 15. A plurality of arcuate clutch shoes or segments 27 are interposed circumferentially between the inner surface of the wall 26 and the outer surface of the clutch drum 15. Segments 27 made of low carbon 1020 steel produce satisfactory results. Each segment is mounted for limited radial movement, the radial movement being guided by a pin 28 which extends into an opening 29 in each segment. Each pin 28 is threaded into an integral boss 30 in the wall 26 of the carrier 24.

A spring 31 having a low spring rate at the disengagement load is interposed between the carrier and each segment 27. The spring is preferably non-linear, that is, such that the spring rate decreases with increasing centrifugal force on the segments. In the form of the invention shown in FIGS. 1–3, the spring 31 comprises a plurality of annular Belleville springs that are interposed between recesses 32 in the segments 27 and a shoulder 33 on the pin 28. Belleville springs made of heat treated SAE 6150 steel produce satisfactory results.

By varying the spring force on the segments 27, the speed at which the clutch engages and disengages is adjusted. This is achieved in the form of the invention shown by threading the pin 28 radially inwardly or outwardly.

In order to start the engine, the starter 12 is energized rotating the clutch drum 15 and, in turn, the shaft 18 through the segments 27 and carrier 24. When the engine reaches a self-sustaining speed, the starter is deenergized. At the desired release speed, the centrifugal force on the clutch segments 27 causes the clutch segments to disengage from the clutch drum 15 and the shaft 18 is driven by the engine at a faster speed than the speed of rotation of the starter motor 12. The starter then comes to a stop. With the use of springs having a low spring rate at the disengagement load, the disengagement is sharp and abrupt without drag. After the clutch segments 27 are disengaged from the clutch drum they move only a very limited distance and the outer surfaces 39 abut against the inner surface of the wall 26 on carrier 24 so that they are in position for re-engagement when the speed of the turbine is reduced. During their movement, segments 27 are guided by pins 28 and the inner surface 35 of wall 25 on carrier 24.

In practice, the initial spring force at zero speed $F_{S_0}$ bears the relation to the desired torque capacity T as follows $$F_{S_0} = T/\mu R$$

where R is the radius of the contact surfaces of segments 27 and drum body 17 and $\mu$ is the coefficient of friction.

The weight of each segment 27 is controlled in order to obtain the desired disengagement and re-engagement at a predetermined speed of rotation in such a manner that the centrifugal force at the desired speed on each segment $F_c$ is equal to the initial spring force $F_{S_0}$.

It has been found in practice that a satisfactory starter clutch comprises a carrier of approximately 4 inches in diameter and one inch in length utilized with a two-horse power starting motor for starting a gas turbine of 100 horsepower capacity. In such a starter clutch, the segments move approximately 0.010 inch into and out of disengagement and operate satisfactorily with and without lubrication.

Although the non-linear spring shown comprises Belleville springs, other springs having the similar spring rate characteristics can be used.

In the form of the invention shown in FIGS. 4–8, starter motor 40 is mounted on the housing 41 of the turbine as in the previous form of the invention. Shaft 42 of the starter motor extends a substantially greater distance outwardly of the starter casing than in the previous form of the invention. A clutch drum 43 is provided on the shaft 42. As shown in FIG. 6, clutch drum 43 includes a part 44 which is keyed to the shaft 42 by key 45 and a part 46 that is threaded onto part 44. Part 46 on part 44 is locked in adjusted position by a screw 47 that is threaded through part 46 and abuts part 44. The peripheries of parts 44, 46 are beveled as at 47, 48 and a plurality of segments 49 having complementary surfaces are positioned around the drum 43. A spring in the form of a continuous metal band 50 is positioned in grooves 51 of the segments 49 and tends to yieldingly urge the segments 49 toward the surfaces 47, 48.

A clutch segment carrier 52 is mounted on the shaft 42 for rotation relative thereto by an arrangement which includes bearings 53 interposed between a tubular extension on carrier 52 and enlarged portions on the shaft 42. The end of the tubular extension 53 is journalled in a bearing 58 in the turbine housing. A gear 61 is fixed on tubular extension 53 and a chain 62 and drives the turbine rotor through a chain 62.

Carrier 52 includes a radial wall 54 and a cylindrical wall 55 surrounding the segments 49. Each segment 49 is guided in its radial movement by a pin 56 which extends radially inwardly from the cylindrical wall into an opening 57 in the segment 49.

As in the previous form of the invention, when the starter 12 is energized, shaft 42 is rotated and, in turn, the tubular extension 53 is rotated through the engagement of the segments 49 with the drum 43. At the desired release speed, the centrifugal force on the segments 49, when the speed of rotation of the tubular extension 53 increases, causes the segments 49 to disengage from the drum 43. The segments 49 move for a limited distance, being guided by the pin 56 and surface 59 of wall 54 until the ends 60 thereof engage the inner surface of the wall 55.

In the form of the invention shown in FIG. 9, starter motor 65 is mounted on the housing 66 of the turbine by screws 13 in substantially the same manner as in the previous forms of the invention. The construction differs from that shown in FIGS. 1–3 in that the ball bearings 67, 68 which support the extension shaft 69 are mounted in a housing 70 which forms a part of the housing of the starter 65 so that no bearing mount is required within the turbine proper. As in the previous forms of the invention, the starter shaft 71 extends within a clutch drum 72 fixed on a shaft 69 and the shaft 69 is, in turn, operatively connected to the turbine rotor by a gear 72 and endless chain 73. The form of clutch shown in FIG. 9 is substantially identical to that shown in FIGS. 1–3. However, the clutch, such as shown in FIGS. 4–8, can be used.

Since there is no torsional slack in the starter clutch, as may occur in jaw clutches, the load is picked up as smoothly as the starting motor is capable of being energized providing a shock free load pickup.

The clutch slipping torque can be set for any desired value if protection of the engine drive line is required. If there is no such limit the clutch will ordinarily be set to slightly exceed the maximum torque capability of the starting motor so that no slip occurs during starting.

Since the starter clutch functions by centrifugal force it will only disengage or engage at known, predetermined speeds. It will not overrun at any other time. No external control signal or power is required. The clutch automatically re-engages on coast down above a speed where the starter is useful so that a restart can be made without any danger of clashing teeth as in a jaw clutch or slipping sprags as in a sprag type over running clutch.

Since the starter clutch has a minimum radial gap when disengaged, on the order of 0.010 inch, the viscous drag of this film of air or lubricant, if present, at even highest turbine speeds is negligible.

Unless the starter clutch is set to limit torque there is essentially no slipping during operation. This is true because the clutch disengages after the starter is de-energized so no torque is being transmitted at disengagement. Similarly, on coast-down the clutch re-engages before the starter is useful so that the only torque is the small amount to bring the starter motor up to speed. If the starter is set to slip during starting, and limit torque, there will in time be some wear dependent upon the duration of slipping. The sintered metallic material is self-lubricating and well adapted to this service. The spring characteristic is such that the clutch is self-adjusting for substantial amounts of wear.

The most important contribution to reliability of the starter clutch is simplicity and freedom from extremely close tolerance manufacture. The spring elements, which are the only parts subjected to dynamic stresses of any consequence, are used in redundant multiples. The failure of one spring element in the form shown in FIGS. 1–3 does not result in complete loss of clutch action but only a reduction in maximum torque capacity. Failure of all springs during engine operation will not cause or require engine stoppage since the shoes are held against the carrier, out of engagement with the drum, by centrifugal force. The drum itself is stationary after the engine starts and free from stress.

The starter clutch components are all metallic—no organic or plastic materials or seals are involved. The design can be made in currently available materials to cover any temperature range in which gas turbines or jet engines are used. The clutch works when completely wet with lubrication oil but does not need lubrication oil to function. It can be operated completely dry.

The starter clutch size and weight varies with design capacity. Its general proportions are those of a disc with diameter to thickness ratio of 3 or 4 to 1. These proportions can be varied over a fairly wide range to suit individual application. Typically the clutch will be smaller in diameter than the starter motor and from 1 to 2 inches long for an electric starter in the 2 to 10-horsepower class.

We claim:

1. In a starter clutch for high-speed engines such as gas turbines, the combination comprising a clutch drum adapted to be mounted on the shaft of a starter, a clutch segment carrier having a portion thereof surrounding said drum, a plurality of arcuate segments positioned between the surrounding portion of said carrier and said drum, means for guiding said segments for radial movement inwardly and outwardly toward and away from said drum, and non-linear spring means interposed between the surrounding portion of the carrier and said segments for yieldingly urging said segments radially inwardly toward said drum, the spring initial force at zero speed $F_{s_0}$ bearing the relation to the desired torque capacity T as follows:

$$F_{s_0} = T/\mu R$$

where R is the shoe contact radius and $\mu$ is the coefficient of friction, the shoe weight being such that at the desired disengagement and re-engagement speed the centrifugal force on the shoe $F_c$ is equal to the initial spring force $F_{s_0}$.

2. In a starter clutch for high-speed engines such as gas turbines, the combination comprising a clutch drum adapted to be mounted on the shaft of the starter, a clutch segment carrier having a portion thereof surrounding said drum, a plurality of arcuate segments positioned between the surrounding portion of said carrier and said drum, pin means extending generally radially between said carrier and said segments for guiding said segments for limited radial movement inwardly and outwardly toward and away from said drum, means on said carrier providing stops for limiting the radial outward movement of said segments and spring means interposed between the surrounding portion of the carrier and said segments for yieldingly urging said segments radially inwardly toward said drum, said pin means extending through said spring means, said spring means comprising a continuous band of spring material surrounding said segments.

3. In a starter clutch for high-speed engines such as gas turbines, the combination comprising a clutch drum adapted to be mounted on the shaft of the starter, a clutch segment carrier having a portion thereof surrounding said drum, a plurality of arcuate segments positioned between the surrounding portion of said carrier and said drum, pin means extending generally radially between said carrier and said segments for guiding said segments for limited radial movement inwardly and outwardly toward and away from said drum, means on said carrier providing stops for limiting the radial outward movement of said segments and spring means interposed between the surrounding portion of the carrier and said segments for yieldingly urging said segments radially inwardly toward said drum, said pin means extending through said spring means, each said segment having an outer peripheral surface provided with a circumferentially extending groove therein which defines axially spaced ends, spring means extending into said grooves, said ends of said segments providing said stops for limiting the radial outward movement of said segments.

References Cited by the Examiner

UNITED STATES PATENTS

| | | |
|---|---|---|
| 704,575 | 7/1902 | Pintsch. |
| 1,114,069 | 10/1914 | Trotter. |
| 2,243,565 | 5/1941 | Kimball et al. |
| 2,432,591 | 12/1947 | Schuckers _____ 192—104 |
| 2,668,611 | 2/1954 | Sparklin _____ 192—104 |
| 7,762,482 | 9/1956 | Davis. |
| 2,765,062 | 10/1956 | Naumann et al. |
| 2,879,873 | 3/1959 | Spase. |

FOREIGN PATENTS

| | | |
|---|---|---|
| 1,116,829 | 2/1956 | France. |
| 1,209,719 | 9/1959 | France. |

DON A. WAITE, *Primary Examiner.*

DAVID J. WILLIAMOWSKY, *Examiner.*